United States Patent
Yang et al.

(10) Patent No.: US 8,438,006 B2
(45) Date of Patent: May 7, 2013

(54) TRANSLATION SYSTEM, TRANSLATION METHOD AND COMPUTER READABLE-WRITABLE STORAGE MEDIUM OF THE SAME

(75) Inventors: Wen-Chi Yang, Taipei (TW); Tsun Ku, Taipei (TW); Chien-Hui Lin, Kaohsiung (TW)

(73) Assignee: Institute for Information Industry, Taipei (TW)

( * ) Notice: Subject to any disclaimer, the term of this patent is extended or adjusted under 35 U.S.C. 154(b) by 769 days.

(21) Appl. No.: 12/635,655

(22) Filed: Dec. 10, 2009

(65) Prior Publication Data
US 2011/0087481 A1    Apr. 14, 2011

(30) Foreign Application Priority Data
Oct. 14, 2009   (TW) ................................ 98134799 A

(51) Int. Cl.
*G06F 17/28* (2006.01)
(52) U.S. Cl.
USPC ................................. 704/4; 704/7
(58) Field of Classification Search .................. 704/1–8
See application file for complete search history.

(56) References Cited

U.S. PATENT DOCUMENTS

| | | | | |
|---|---|---|---|---|
| 5,907,821 A | * | 5/1999 | Kaji et al. | 704/4 |
| 7,047,182 B2 | * | 5/2006 | Masuichi | 704/7 |
| 7,620,538 B2 | * | 11/2009 | Marcu et al. | 704/2 |
| 8,051,061 B2 | * | 11/2011 | Niu et al. | 707/706 |
| 2007/0174040 A1 | * | 7/2007 | Liu et al. | 704/2 |
| 2010/0138211 A1 | * | 6/2010 | Shi et al. | 704/3 |

OTHER PUBLICATIONS

Cheng et al., "Translating Unknown Queries with Web Corpora for Cross-Language Information Retrieval", Proceedings of the 27th Annual International ACM SIGIR Conference on Research and Development in Information Retrieval, 2004.*

Zhang et al., "Using the Web for Automated Translation Extraction in Cross-Language Information Retrieval", Proceedings of the 27th Annual International ACM SIGIR Conference on Research and Development in Information Retrieval, 2004.*

* cited by examiner

*Primary Examiner* — Samuel G Neway
(74) *Attorney, Agent, or Firm* — Jianq Chyun IP Office

(57) ABSTRACT

A translation system is provided. The system includes an input interface for receiving a term to be translated, a multi-language term processing module, a term correlation calculation module and an analysis module. The multi-language term processing module collects multi-language correlated terms corresponding to the term to be translated and language data sources, and establishes term pairs each including any two multi-language correlated terms having a relationship in translation. The multi-language correlated terms include at least the term to be translated and at least one candidate translated term in the target language. The term correlation calculation module calculates a term correlation value between the two multi-language correlated terms of each term pair and a self correlation value of each multi-language correlated term. The analysis module determines one of the candidate translated terms as the translation result term according to the term correlation values and the self correlation values.

12 Claims, 10 Drawing Sheets

| word A | word B | language data source |
|---|---|---|
| aunt | 伯母 (wife of Father's elder brother) | dictionary A |
| 백모 (wife of Father's elder brother) | aunt | B electronic translator |
| 伯母 (wife of Father's elder brother) | 백모 (wife of Father's elder brother) | online dictionary |
| aunt | 고모 (Father's sister) | dictionary C |
| aunt | 伯妈 (wife of Father's elder brother in Simple Chinese) | existing dictionary |
| 伯母 (wife of Father's elder brother) | 伯妈 (wife of Father's elder brother in Simple Chinese) | Internet search |

FIG. 3

| number of web pages | aunt | 고모 (Father's sister) | 백모 (wife of Father's elder brother) | 伯母 (wife of Father's elder brother) | 伯媽 (an alterative name for wife of Father's elder brother) |
| --- | --- | --- | --- | --- | --- |
| aunt | 28200000 | | | | |
| 고모 (Father's sister) | 7080 | 623000 | | | |
| 백모 (wife of Father's elder brother) | 60 | 2220 | 38900 | | |
| 伯母 (wife of Father's elder brother) | 34900 | 1110 | 1230 | 751000 | |
| 伯媽 (an alterative name for wife of Father's elder brother) | 4030 | 8 | 7 | 34000 | 7200 |

FIG. 4

| | aunt | 고모 (Father's sister) | 백모 (wife of Father's elder brother) | 백모 (wife of Father's elder brother) | 백嬤 (an alterative name for wife of Father's elder brother) |
|---|---|---|---|---|---|
| aunt | 2.9146 | | | | |
| 고모(Father's sister) | 11.2803 | 3.7475 | | | |
| 백모(wife of Father's elder brother) | 24.4239 | 12.9781 | 4.7309 | | |
| 백모(wife of Father's elder brother) | 9.5600 | 14.2610 | 14.0553 | 3.6957 | |
| 백嬤(an alterative name for wife of Father's elder brother) | 12.0460 | 48.0898 | 51.3898 | 9.5839 | 5.6295 |

FIG. 5A

| | aunt | 고모<br>(Father's sister) | 백모(wife of Father's elder brother) | 백모(wife of Father's elder brother) | 伯媽(an alterative name for wife of Father's elder brother) |
|---|---|---|---|---|---|
| aunt | | 0.058292 | | | |
| 고모(Father's sister) | 0.112803 | 0.07495 | | | |
| 백모(wife of Father's elder brother) | 0.244239 | 0.129781 | 0.094618 | | |
| 伯母(wife of Father's elder brother) | 0.095600 | 0.142610 | 0.140553 | 0.073914 | |
| 伯媽(an alterative name for wife of Father's elder brother) | 0.120460 | 0.480898 | 0.513898 | 0.095839 | 0.11259 |

FIG. 5B

| | aunt | 고모 (Father's sister) | 백모 (wife of Father's elder brother) | 백모(wife of Father's elder brother) | 백媽(an alterative name for wife of Father's elder brother) |
|---|---|---|---|---|---|
| aunt | 17.155 | | | | |
| 고모(Father's sister) | 8.865 | 13.3422 | | | |
| 백모(wife of Father's elder brother) | 4.0944 | 7.7053 | 10.5688 | | |
| 백모(wife of Father's elder brother) | 10.4602 | 7.0121 | 7.1148 | 13.5292 | |
| 백媽(an alterative name for wife of Father's elder brother) | 8.3015 | 2.07944 | 1.9459 | 10.4342 | 8.8818 |

FIG. 5C

TRANSLATION SYSTEM, TRANSLATION METHOD AND COMPUTER READABLE-WRITABLE STORAGE MEDIUM OF THE SAME

CROSS-REFERENCE TO RELATED APPLICATION

This application claims the priority benefit of Taiwan application serial no. 98134799, filed on Oct. 14, 2009. The entirety of the above-mentioned patent application is hereby incorporated by reference herein and made a part of this specification.

BACKGROUND OF THE INVENTION

1. Field of the Invention

The present invention relates to a translation system, translation method, and a computer readable-writable storage medium, and more particularly to a multi-language translation system, translation method, and a computer readable-writable storage medium.

2. Description of Related Art

When a conventional multi-language translation tool or a translation data source (e.g. a translation platform of two or more languages) or a cross-language electronic dictionary translates an inquired term into a non-English result term, English is generally used as an intermediary and the inquired term is first translated into an English term which is then translated into a term in the target language. Please note that "term" used throughout this specification and the claims includes words, phrases, proper nouns, vocabulary, etc.

However, in such process of cross-language or multi-language translation with English as the intermediary, meaning loss often occurs in the translation result due to the difference in the meanings or in the choice of terms. In other words, the process of first translating the inquired term into an English term with a less profound meaning and then re-translating the English term into a term in the target language, i.e. a translation process from a profound meaning to a less profound one, results in low association or even difference between the inquired term and the final translation result of the term in the target language, which leads to imprecise translation or even fallacious translation.

For example, in Chinese, "阿姨" (Mother's sister), "伯母" (wife of Father's elder brother), "姑姑" (Father's sister), and "舅媽" (wife of Mother's brother) correspond respectively to "이모" (Mother's sister), "백모" (wife of Father's elder brother), "고모" (Father's sister), and "외숙모" (wife of Mother's brother) in Korean. However, if the above terms "阿姨" (Mother's sister), "伯母" (wife of Father's elder brother), "伯 母" (wife of Father's elder brother), and "舅媽" (wife of Mother's brother) are translated into a less meaningful English term "aunt" and then re-translated into Korean, the precise correspondence between the Chinese and Korean terms is lost and thus mistakes may occur. In other words, when Chinese is translated into Korean, different Chinese terms should correspond to different Korean terms. However, conventional translation systems, especially multi-language translation systems that do not directly translate Chinese to Korean but first translates Chinese terms into English terms, may have imprecise translation or even erroneous translation because different Chinese terms may be correspondingly translated into a same English term due to difference in culture or traditional language use and then the English term is translated into Korean or another target language.

In addition, in such translation method using English as the intermediary, translation error may occur due to the differences in the use of terms among languages, resulting in the lack of appropriate corresponding terms in English.

For example, the term "節氣" in Chinese is important and commonly used in the calendar system in Asia. (In the Chinese calendar system, the year is divided into 24 periods, i.e. 節氣, according to seasonal change. Each of the periods is given a name based on the agricultural and fishery schedule requirement of farmers and fishermen for their reference.) However, such term is not used in English speaking regions where there is no such calendar system based on "節氣" Hence, there is no corresponding term in English. As such, translation error may occur when using this multi-language translation mechanism with English as the intermediary to perform translation. The Chinese term "節氣" as mentioned above is translated into English and re-translated into Korean "조건" meaning "terms", and the translation result is incorrect. As such, poor or imprecise translation or even incorrect translation may occur. Such differences in the use of terms bring about even more seriously poor or fallacious translation in cross-language translation among non-English languages.

SUMMARY OF THE INVENTION

The invention provides a translation system, translation method, and a computer readable-writable storage medium which provide a translation result with the closest meaning by calculating a mixed correlation amount and correlation strength of multi-language translation paths and quickly integrating correlation among multiple languages.

The invention provides a translation system, translation method, and a computer readable-writable storage medium which, rather than using English as the intermediary, support correlation among multiple languages and increase translation precision by calculating correlation among terms.

The invention provides a translation system for translating a term to be translated in an initial language into a translation result term in a target language. The translation system includes an input interface, a multi-language term processing module, a term correlation calculation module, and an analysis module. The input interface is used to receive the term to be translated. The multi-language term processing module, based on the term to be translated and a plurality of language data sources, collects a plurality of multi-language correlated terms corresponding to the term to be translated, and establishes term pairs each including any two multi-language correlated terms that have a corresponding relationship in translation, wherein the plurality of multi-language correlated terms include at least the term to be translated and at least one candidate translated term in the target language. The term correlation calculation module calculates a term correlation value between the two multi-language correlated terms for each of the term pairs and a self correlation value for each of the multi-language correlated terms. The analysis module determines at least one of the candidate translated terms to be the translation result term based on the multi-language correlated terms and the self correlation values thereof as well as the term pairs and the term correlation values thereof.

The invention further provides a translation method for translating a term to be translated in an initial language into a translation result term in a target language. The translation method includes based on the term to be translated and a plurality of language data sources, collecting a plurality of multi-language correlated terms corresponding to the term to be translated, and establishing term pairs each including any two multi-language correlated terms that have a corresponding relationship in translation, wherein the plurality of multi-language correlated terms include at least the term to be translated and at least one candidate translated term in the target language. A term correlation value between the two multi-language correlated terms for each of the term pairs and a self correlation value for each of the multi-language correlated terms are calculated. At least one of the candidate translated terms is determined to be the translation result term based on the multi-language correlated terms and the respective self correlation values thereof as well as the term pairs and the respective term correlation values thereof.

The invention further provides a computer readable-writable storage medium for storing a translation program to translate a term to be translated in an initial language into a translation result term in a target language, wherein the translation program executes a plurality of instructions including based on the term to be translated and a plurality of language data sources, collecting a plurality of multi-language correlated terms corresponding to the term to be translated, and establishing term pairs each including any two multi-language correlated terms that have a corresponding relationship in translation, wherein the plurality of multi-language correlated terms include at least the term to be translated and at least one candidate translated term in the target language. A term correlation value between the two multi-language correlated terms for each of the term pairs and a self correlation value for each of the multi-language correlated terms are calculated. At least one of the candidate translated terms is determined to be the translation result term based on the multi-language correlated terms and the respective self correlation values thereof as well as the term pairs and the respective term correlation values thereof.

According to one embodiment of the invention, in the translation system, the translation method, and the computer readable-writable storage medium of the invention, the establishing term pairs each including any two multi-language correlated terms that have a corresponding relationship in translation further includes building a multi-language term reference table to store the term pairs.

According to one embodiment of the invention, in the translation system, the translation method, and the computer readable-writable storage medium of the invention, the analysis module further includes based on the term pairs, building a distributed translation structure in which the multi-language correlated terms are a plurality of nodes and the corresponding nodes in each of the term pairs are connected by a connection line. In addition, the distributed translation structure further includes corresponding the self correlation values of the multi-language correlated terms to the nodes and corresponding the term correlation value of each of the term pairs to the connection line of the term pair. Furthermore, the analysis module further includes analyzing at least one translation path with the term to be translated as a start point and each of the candidate translated terms as an end point according to the distributed translation structure, and determining at least one of the candidate translated terms to be the translation result term based on the self correlation values and the term correlation value corresponding to the plurality of nodes and connection lines in the at least one translation path. Moreover, the analysis module analyzes the translation path according to a shortest path algorithm including the Dijkstra algorithm.

According to one embodiment of the invention, in the translation system, the translation method, and the computer readable-writable storage medium of the invention, the term correlation calculation module calculates the term correlation value between the two multi-language correlated terms of each of the term pairs by taking a co-appearance frequency of the two multi-language correlated terms showing up in an Internet search result to be the term correlation value between the two multi-language correlated terms, and calculates the self correlation value of each of the multi-language correlated terms by taking a single-appearance frequency of the multi-language correlated term showing up in the Internet search result to be the self correlation value of the multi-language correlated term. Additionally, the term correlation calculation module further includes first normalizing the co-appearance frequency and replacing the co-appearance frequency with the normalization result to be the term correlation value between the two multi-language correlated terms, and first normalizing the single-appearance frequency and replacing the single-appearance frequency with the normalization result to be the self correlation value of the multi-language correlated term.

According to one embodiment of the invention, in the translation system, the translation method, and the computer readable-writable storage medium of the invention, the language data sources include electronic dictionaries in multiple languages, translation software, Internet translation platforms, correspondence databases of language uses among countries using a same language, professional term reference tables in multiple languages, and traditional and simplified Chinese correspondence databases.

According to the above, the invention uses a term correlation value of a term pair having terms with a correspondence relationship in translation and a self correlation value of a single multi-language correlated term itself to build a distributed translation structure and look up possible translation paths between the term to be translated and each of the candidate translated terms according to the distributed translation structure. Precision of translation is increased and multi-language translation results with more appropriate meanings are provided by calculating term correlation values among the multi-language correlated terms and self correlation values of the multi-language correlated terms and integrating the amount of correlation on the branch paths of the multi-language translation.

In order to make the aforementioned and other features and advantages of the invention more comprehensible, embodiments accompanying figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIG. 3 is a schematic diagram of a multi-language term reference table according to one embodiment of the invention.

FIG. 4 is a schematic diagram of statistics illustrating respective single-appearance frequencies and co-appearance frequencies of correlated terms according to one embodiment of the invention.

FIG. 5A is a schematic diagram illustrating the normalized co-appearance frequencies and single-appearance frequencies in the statistics table of FIG. 4 according to one embodiment of the invention.

FIG. 5B is a schematic diagram illustrating the normalized co-appearance frequencies and single-appearance frequencies in the statistics table of FIG. 4 according to another embodiment of the invention.

FIG. 5C is a schematic diagram illustrating the normalized co-appearance frequencies and single-appearance frequencies in the statistics table of FIG. 4 according to still another embodiment of the invention.

DESCRIPTION OF EMBODIMENTS

Figure 1:
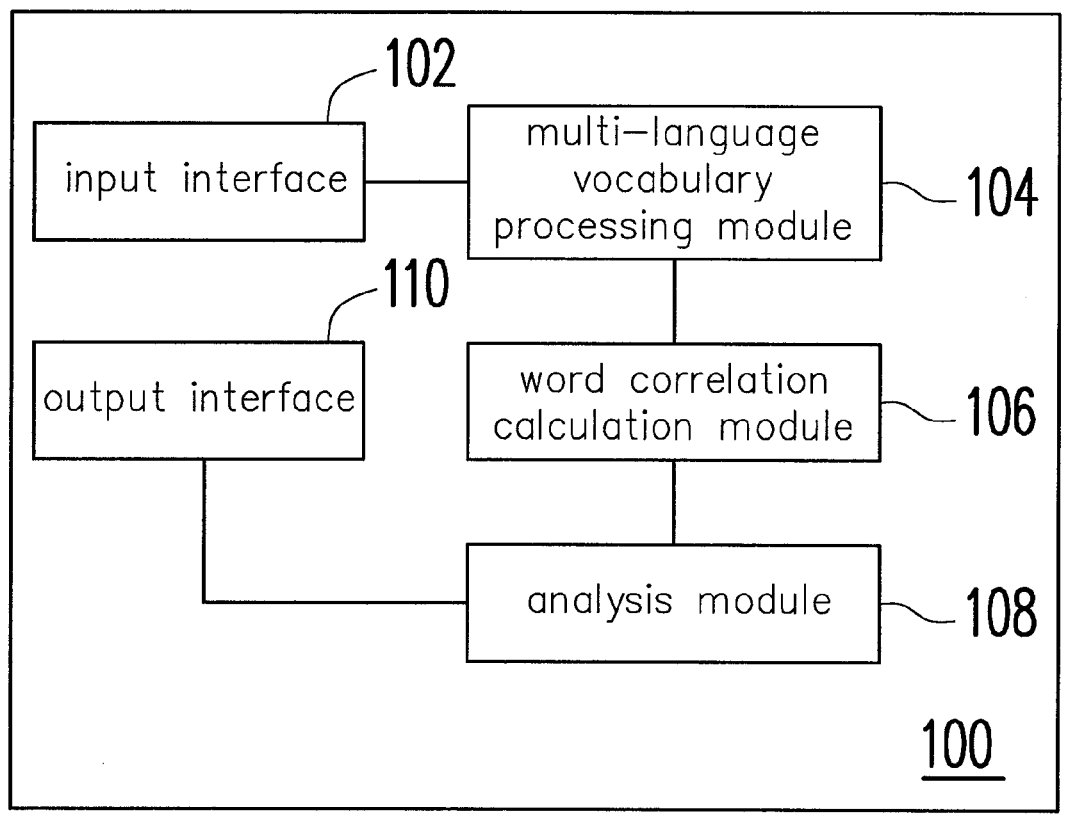
FIG. 1 is a schematic diagram of a translation system according to one embodiment of the invention.

FIG. 1 is a schematic diagram of a translation system according to one embodiment of the invention. Referring to FIG. 1, a translation system 100 of the invention includes an input interface 102, a multi-language term processing module 104, a term correlation calculation module 106, an analysis module 108, and an output interface 110. A user inputs a term in an initial language as a term to be translated which is received by the input interface 102 and translated by the translation system 100 of the invention into a translation result term in a target language which is then presented to the user by the output interface 110. The inputted term in the initial language is, for example, various phrases, single words, compound phrases, or idioms. In one embodiment of the invention, the inputted term is, for example, a proper noun. In another embodiment, the input interface 102 and the output interface 110 may be integrated as an operation interface.

Figure 2:
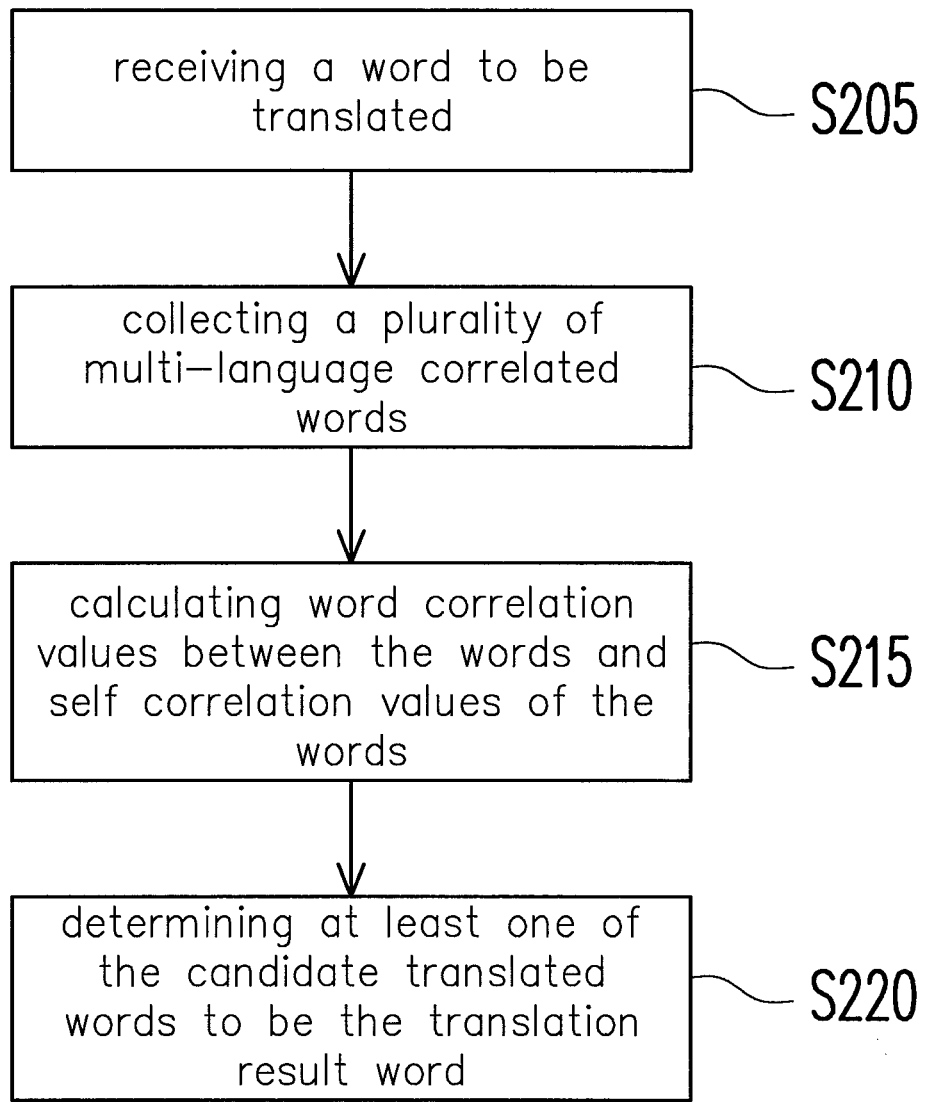
FIG. 2 is a flowchart of a translation method according to one embodiment of the invention.

FIG. 2 is a flowchart of a translation method according to one embodiment of the invention. Referring to FIG. 1 and FIG. 2, in step S205, the input interface 102 receives a term to be translated. Then in step S210, the multi-language term processing module 104 collects a plurality of multi-language correlated terms corresponding to the term to be translated according to the term to be translated and a plurality of language data sources. In the plurality of multi-language correlated terms, any two of the multi-language correlated terms having a correspondence relationship in translation are formed as a term pair. The multi-language correlated terms include at least the term to be translated and at least one candidate translated term in the target language. The language data sources include electronic dictionaries in multiple languages, translation software, Internet translation platforms, correspondence databases of language uses among countries using a same language, professional term reference tables in multiple languages, and traditional and simplified Chinese correspondence databases.

In one embodiment, in step S210, the collecting the plurality of multi-language correlated terms further includes building a multi-language term reference table to store the terms pairs. Furthermore, in another embodiment, a distributed look-up method may be used. For example, a plurality of term in multiple languages corresponding to the term to be translated are looked up in a plurality of language data sources. Then, the plurality of terms in multi-languages that are looked up using the term to be translated as a basis are then used as inquiry term to search for other terms in the language data sources. The searched terms have to include at least one term in the target language to be the candidate translated term. The terms collected through the above method and the term to be translated itself can be used partially or wholly as the plurality of multi-language correlated terms in the multi-language term reference table and the multi-language correlated terms include at least the term to be translated and the at least one candidate translated term in the target language. As such, any two of the multi-language correlated terms having a correspondence relationship in translation form a term pair. In other terms, in each term pair, the two multi-language correlated terms have a correspondence relationship in translation and are generated through one of the language data sources.

FIG. 3 is a schematic diagram of a multi-language term reference table according to one embodiment of the invention. Referring to FIG. 3, in one embodiment, if the term to be translated is "伯母" (wife of Father's elder brother) in traditional Chinese and is to be translated into Korean, the multi-language term reference table as shown in FIG. 3 can be obtained through the above-mentioned distributed look-up method. The multi-language correlated terms in the multi-language term reference table include the term to be translated, "伯母" (wife of Father's elder brother), in addition to the candidate translated terms in the target language (i.e. Korean), "백모" (wife of Father's elder brother) and "고모" (Father's sister) as well as terms in other languages. In addition, in another embodiment, terms under term A in column 302 (or terms under term B in column 304) in the multi-language term reference table can be used as an inquiry term. Terms under term B (or term A) can be obtained by corresponding translation between the different languages of the language data sources shown in column 306. Taking a first row 308 in the multi-language term reference table in FIG. 3 as an example, the term "aunt" in column 302 is translated as the term "伯母" (wife of Father's elder brother) in column 304 through dictionary A shown in column 306.

Subsequently, in step S215, the term correlation calculation module 106 calculates a term correlation value between the two multi-language correlated terms for each term pair and a self correlation value for each multi-language correlated term. According to another embodiment of the invention, the term correlation calculation module 106 calculates a co-appearance frequency of the two multi-language correlated terms in each term pair showing up in an Internet search result and calculates a single-appearance frequency of each multi-language correlated term showing up in the Internet search result. In still another embodiment, the two multi-language correlated terms in each term pair are used as a search target to search a co-appearance frequency of the two multi-language correlated terms simultaneously showing up in a same digital record through an Internet search engine. Accordingly, the appearance frequency may also be the number of search results or the number of times obtained by the search engine searching the Internet. Similarly, a single multi-language correlated term is used as a search target of a search engine to look up the single-appearance frequency of the multi-language correlated term individually showing up on the Internet.

FIG. 4 is a schematic diagram of statistics illustrating respective single-appearance frequencies and co-appearance frequencies of correlated terms according to one embodiment of the invention. Referring to FIG. 4, in the present embodiment, a certain Internet search engine is used to look up the co-appearance frequency between the two multi-language correlated terms in each term pair showing up on the Internet and a single-appearance frequency of each multi-language correlated term showing up on the Internet. As shown in FIG. 4, a calculated number of web pages in the search result returned by the search engine using the search targets represents the appearance frequency. As such, the multi-language correlated term "aunt" has a single-appearance frequency of 28.2 million times while the co-appearance frequency of the multi-language correlated term "aunt" and the multi-language correlated term "伯母" (wife of Father's elder brother) is 34 thousand and 9 hundred times.

Referring to FIG. 4, one can tell the degree of correlation between the two multi-language correlated terms in each term pair from the co-appearance frequency obtained after searching the Internet. That is, when the co-appearance frequency of two multi-language correlated terms gets larger, the degree of correlation between the two multi-language correlated terms is also higher. On the contrary, when the co-appearance frequency of two multi-language correlated terms gets smaller, the degree of correlation between the two multi-language correlated terms is lower. Take the multi-language correlated term "伯母" (wife of Father's elder brother) and the multi-language correlated term "고모" (Father's sister) as well as the multi-language correlated term "伯母" (wife of Father's elder brother) and the multi-language correlated term "백모" (wife of Father's elder brother) as examples. From FIG. 4, the multi-language correlated term "伯母" (wife of Father's elder brother) and the multi-language correlated term "고모" (Father's sister) have a co-appearance frequency of 1110 while the multi-language correlated term "伯母" (wife of Father's elder brother) and the multi-language correlated term "백모" (wife of Father's elder brother) have a co-appearance frequency of 1230. Therefore, it can be known that as compared to the multi-language correlated term "伯母" (wife of Father's elder brother) and the multi-language correlated term "고모" (Father's sister), the multi-language correlated term "伯母" (wife of Father's elder brother) and the multi-language correlated term "백모" (wife of Father's elder brother) have a larger/higher correlation.

In another embodiment, in step S215, the term correlation calculation module 106 may further normalize the co-appearance frequency and the single-appearance frequency and then replace the co-appearance frequency and the single-appearance frequency with the normalization results to be the term correlation value and the self correlation value. FIG. 5A is a schematic diagram illustrating the normalized co-appearance frequencies and single-appearance frequencies in the statistics table of FIG. 4 according to one embodiment of the invention. Referring to FIG. 5A, in one embodiment, the co-appearance frequency and the single-appearance frequency in FIG. 4 are normalized according to the following function I and function II.

Function I: $\alpha \times 1/\ln(Srch(x,y))$, which is used to normalize the co-appearance frequency of the two multi-language correlated terms in each term pair showing up on the Internet.

Function II: $\beta \times 1/\ln(Srch(x))$, which is used to normalize the single-appearance frequency of each multi-language correlated term showing up on the Internet.

$Srch(x,y)$ represents the co-appearance frequency of the two multi-language correlated terms x and y in each term pair showing up on the Internet. $Srch(x)$ represents the single-appearance frequency of the multi-language correlated term x showing up on the Internet. In addition, $\alpha$ and $\beta$ are respectively constants. In one embodiment, $\alpha$ is approximately 100 and $\beta$ is about 50. However, the invention is not limited herein. In other terms, the constants $\alpha$ and $\beta$ may be customarily adjusted based on user habits or actual requirements.

After normalizing the co-appearance frequency and the single-appearance frequency in FIG. 4 using functions I and II, the normalization values shown in FIG. 5A have an inverse relationship to the degrees of correlation they represent. In other words, when the two multi-language correlated terms have a higher correlation, the term correlation value obtained from the normalized co-appearance frequency is smaller. Contrarily, when the two multi-language correlated terms have a lower correlation, the term correlation value obtained from the normalized co-appearance frequency is larger. In addition, when the single-appearance frequency of the multi-language correlated term gets higher, the normalized self correlation value is smaller. On the contrary, when the single-appearance frequency of the multi-language correlated term gets lower, the normalized self correlation value is larger.

The above description illustrates normalizing the co-appearance frequency and the single-appearance frequency of the multi-language correlated terms respectively as the term correlation value and the self correlation value using the functions I and II as the normalization functions to decrease the difference between extremely large and extremely small co-appearance frequency and single-appearance frequency of the multi-language correlated terms. However, the method for normalizing the co-appearance frequency and the single-appearance frequency of the multi-language correlated terms in the invention is not limited thereto. FIG. 5B is a schematic diagram illustrating the normalized co-appearance frequencies and single-appearance frequencies in the statistics table of FIG. 4 according to another embodiment of the invention. Referring to FIG. 5B, in one embodiment, the co-appearance frequency and the single-appearance frequency in FIG. 4 are normalized according to the following function III and function IV.

Function III: $1/\ln(Srch(x,y))$, which is used to normalize the co-appearance frequency of the two multi-language correlated terms in each term pair showing up on the Internet.

Function IV: $1/\ln(Srch(x))$, which is used to normalize the single-appearance frequency of each multi-language correlated term showing up on the Internet.

$Srch(x,y)$ represents the co-appearance frequency of the two multi-language correlated terms x and y in each term pair showing up on the Internet. $Srch(x)$ represents the single-appearance frequency of the multi-language correlated term x showing up on the Internet.

After normalizing the co-appearance frequency and the single-appearance frequency in FIG. 4 using the functions III and IV, the normalization values shown in FIG. 5B have an inverse relationship to the degrees of correlation they represent. Contrarily, when the two multi-language correlated terms have a higher correlation, the term correlation value obtained from the normalized co-appearance frequency is smaller. In other words, when the two multi-language correlated terms have a lower correlation, the term correlation value obtained from the normalized co-appearance frequency is larger. In addition, when the single-appearance frequency of the multi-language correlated term gets higher, the normalized self correlation value is smaller. On the contrary, when the single-appearance frequency of the multi-language correlated term gets lower, the normalized self correlation value is larger.

In addition, in another embodiment, a normalization function is further provided to normalize the co-appearance frequency and the single-appearance frequency presented in FIG. 4. FIG. 5C is a schematic diagram illustrating the normalized co-appearance frequency and single-appearance frequency in the table of FIG. 4 according to yet another embodiment of the invention.

Referring to FIG. 5C, in the present embodiment, the co-appearance frequency and the single-appearance frequency in FIG. 4 are normalized according to the following function V and function VI.

Function V: ln(Srch(x,y)), which is used to normalize the co-appearance frequency of the two multi-language correlated terms in each term pair showing up on the Internet.

Function VI: ln(Srch(x)), which is used to normalize the single-appearance frequency of each multi-language correlated term showing up on the Internet.

Srch(x,y) represents the co-appearance frequency of the two multi-language correlated terms x and y in each term pair showing up on the Internet. Srch(x) represents the single-appearance frequency of the multi-language correlated term x showing up on the Internet. In the present embodiment, natural logarithmic calculation is directly performed on the co-appearance frequency and the single-appearance frequency of the multi-language correlated terms for normalization thereof. Therefore, after normalizing the co-appearance frequency and the single-appearance frequency in FIG. 4 using the functions V and VI, the normalization values shown in FIG. 5C have a direct relationship to the degrees of correlation they represent. In other words, when the two multi-language correlated terms have a higher correlation, the term correlation value obtained from the normalized co-appearance frequency is larger. Contrarily, when the two multi-language correlated terms have a lower correlation, the term correlation value obtained from the normalized co-appearance frequency is smaller. In addition, when the single-appearance frequency of the multi-language correlated term gets higher, the normalized self correlation value is larger. On the contrary, when the single-appearance frequency of the multi-language correlated term gets lower, the normalized self correlation value is smaller.

Then, in step S220, the analysis module 108 determines at least one of the candidate translated terms to be the translation result term according to the multi-language correlated terms and the respectively corresponding self correlation values, as well as the term pairs and the respectively corresponding term correlation values.

In another embodiment, the step S220 further includes the analysis module 108 building a distributed translation structure according to the term pairs. In other terms, the analysis module 108, according to the term correlation value of each term pair and the self correlation value of each multi-language correlated term provided by the term correlation calculation module 106, builds the distributed translation structure in which each multi-language correlated term is a node and the nodes of a term pair are connected with a connection line. In addition, the distributed translation structure further includes corresponding the self correlation values of the multi-language correlated terms to the nodes and corresponding the term correlation value of each of the term pairs to the connection line of the term pair.

Figure 6:
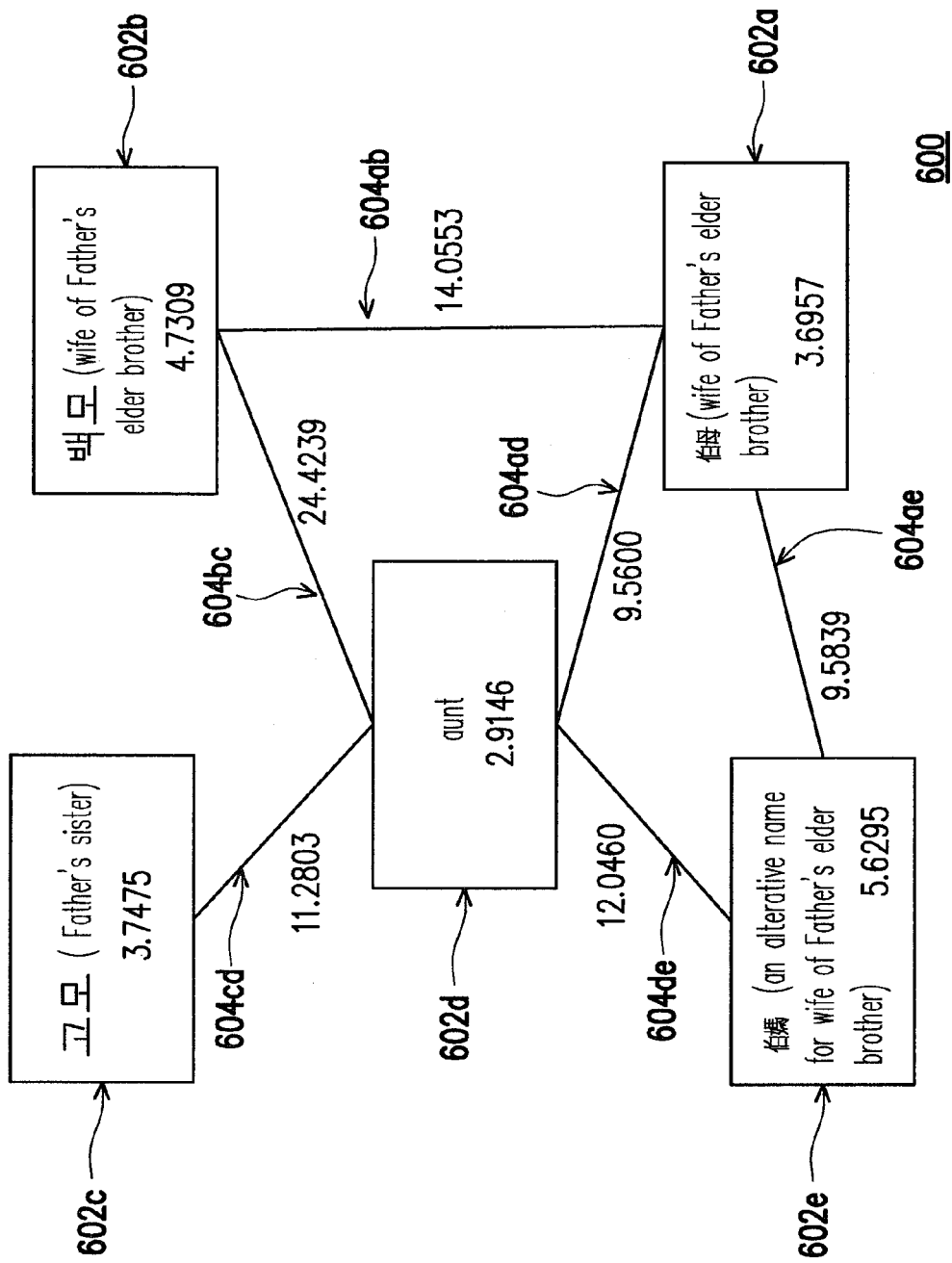
FIG. 6 is a schematic diagram of a distributed translation structure established according the result of normalization in the FIG. 5A.

FIG. 6 is a schematic diagram of a distributed translation structure established according the result of normalization in the FIG. 5A. Referring to FIG. 5A and FIG. 6, each node (including nodes 602a, 602b, 602c, 602d, and 602e) in a distributed translation structure 600 represents the self correlation value of the multi-language correlated term the node represents, and the connection lines between nodes (including connection lines 604ab, 604bc, 604cd, 604de, 604ae, and 604ad) respectively represent a term correlation value of the two multi-language correlated terms represented by two nodes of a term pair.

In another embodiment, the step S220 further includes that the analysis module 108, according to the distributed translation structure, the term to be translated, and the candidate translated terms in the target language, determines at least one translation path in the distributed translation structure having the term to be translated as a start point and each of the candidate translated terms as an end point. (for example, take the term to be translated "伯母" (wife of Father's elder brother) in the initial language Chinese to be translated into the target language Korean. In the distributed translation structure 600, the node 602a representing the term to be translated "伯母" "(wife of Father's elder brother) is taken as the start point and the nodes 602b and 602c representing each of the candidate translated terms (including "백모" (wife of Father's elder brother) and "고모" (Father's sister)) as the end points. At least one translation path from the start point to each end point is determined.) In addition, the at least one translation path is analyzed to determine one of the candidate translated terms as the translation result term. Moreover, the analysis module 108, when analyzing the at least one translation path from the term to be translated to each of the candidate translated terms, can determine a correlation value between the term to be translated and each of the candidate translated terms according to the self correlation value corresponding to each of the nodes and the term correlation values corresponding to the connection lines from the start point to the end point, and then determines one of the candidate translated terms (i.e. one of the end points on the translation path) to be the translation result term in the target language according to the correlation value of each candidate translated term.

In some embodiments, the analysis module 108 finds all possible paths (probably including one or more translation paths) from the term to be translated to each of the candidate translated terms in the distributed translation structure and then calculates the correlation between the term to be translated and the candidate translated term according to the correlation values corresponding to all the nodes and connection lines from the start point to the end point on the found translation paths (i.e. the self correlation value corresponding to each node and the term correlation value corresponding to each connection line between the nodes). In some other embodiments, in the process of finding all possible translation paths from the term to be translated to the each candidate translated term, paths that are repeated and connected in parallel may be eliminated. In still some other embodiments, the method of calculating the correlation between the term to be translated and the candidate translated term may adopt a formula for calculating electric resistance of a parallel connection and a serial connection. After calculating the correlation between the term to be translated and the candidate translated term, one of the candidate translated terms is determined to be the translation result term according to the calculated correlation.

The method for determining the plurality of paths in the distributed translation structure from the term to be translated (the start point) to each of the candidate translated terms (the ending points) includes a path algorithm. In one embodiment, the above-mentioned path algorithm is, for example, a shortest path algorithm including the Dijkstra algorithm.

Figure 7A:
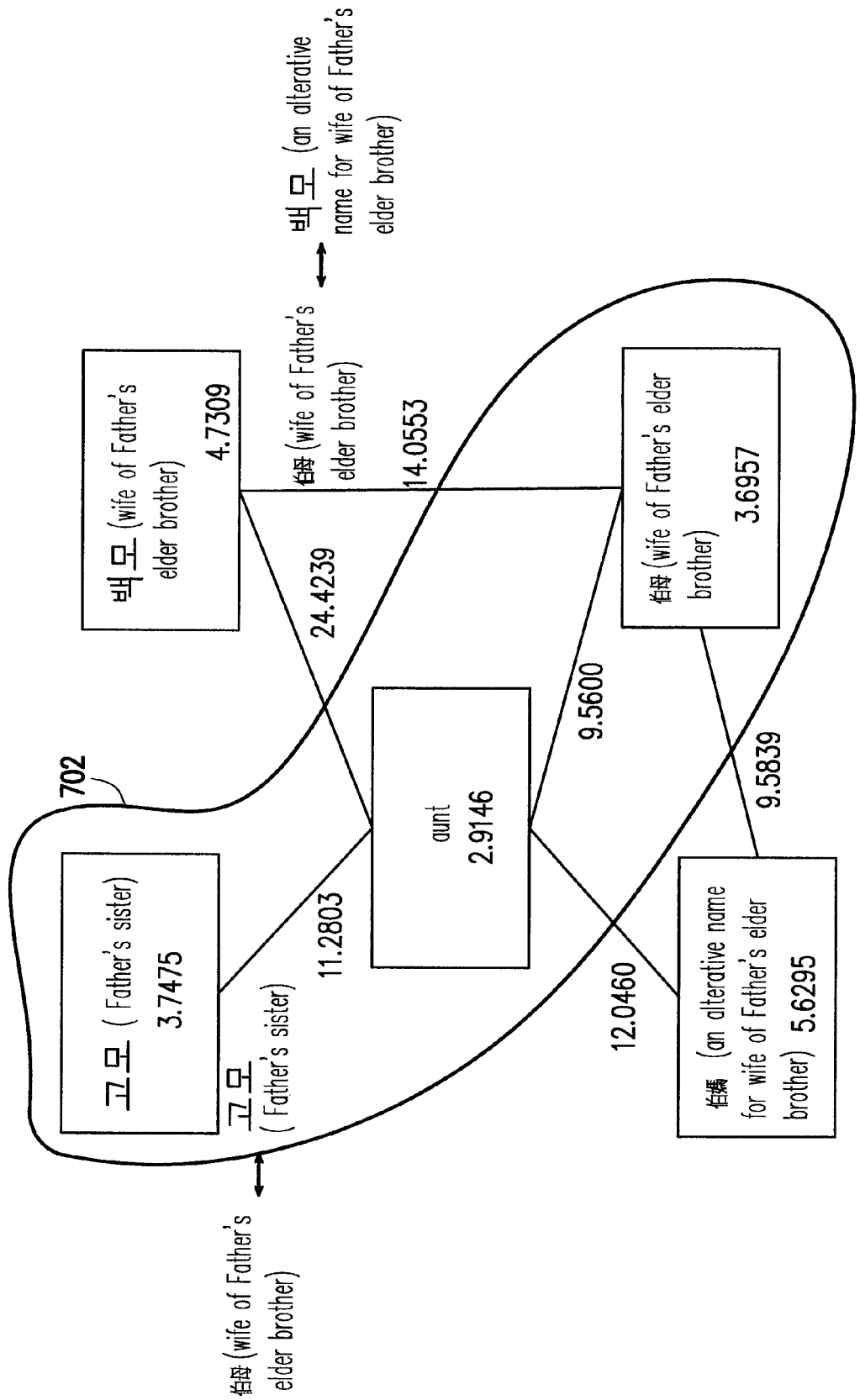
FIG. 7A is a schematic diagram illustrating the determination of at least one translation path in the distributed translation structure in FIG. 6 according to one embodiment of the invention.
Figure 7B:
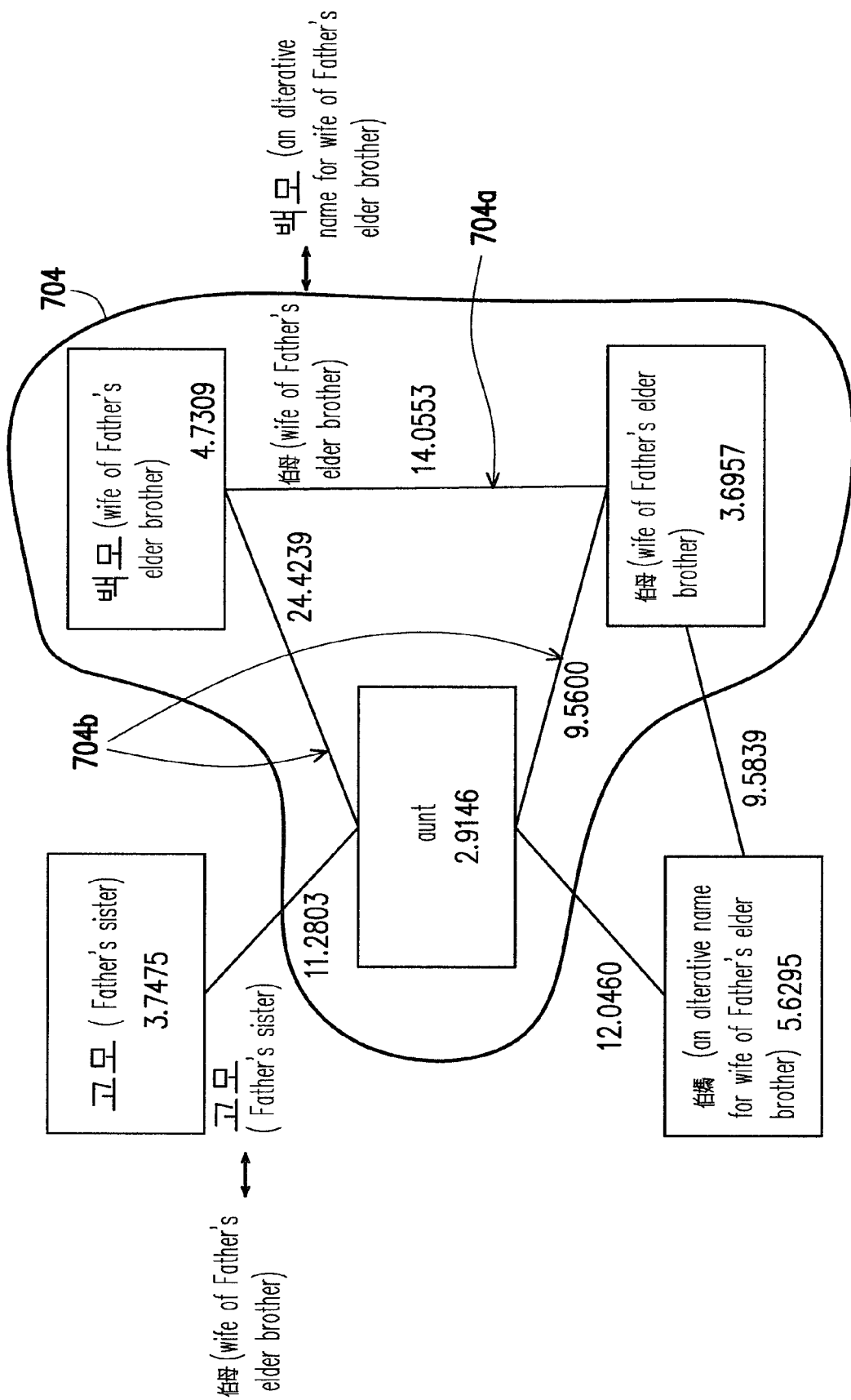
FIG. 7B is a schematic diagram illustrating the determination of at least one translation path in the distributed translation structure in FIG. 6 according to one embodiment of the invention.

FIG. 7A and FIG. 7B are schematic diagrams illustrating the determination of at least one translation path in the distributed translation structure in FIG. 6 according to one embodiment of the invention. Referring to FIG. 7A and FIG. 7B, in the present embodiment, taking the term to be translated "伯母" (wife of Father's elder brother) in the initial language Chinese to be translated into the target language Korean as an example, a translation path 702 (in FIG. 7A) from the node 602a representing the term to be translated "伯母" (wife of Father's elder brother) to the node 602c representing the candidate translated term "고모" (Father's sister) and a translation path 704 (in FIG. 7B) from the node 602a representing the term to be translated "伯母" (wife of Father's elder brother) to the node 602b representing the candidate translated term "백모" (wife of Father's elder brother) in the distributed translation structure are determined.

Subsequently, the analysis module 108 performs a mixed calculation on the self correlation values corresponding to all the nodes including the start point and the end point and the term correlation values corresponding to the connection lines between the nodes on each translation path so as to cross-calculate an amount of term correlation and strength of correlation (term correlation value) on each translation path to determine one of the ending points of the translation paths 702 and 704 to be the translation result term in the target language of the term to be translated. In other words, the factors to determine the translation result term in the target language of the term to be translated are not only the simple consideration on the term correlation value between the two multi-language correlated terms in the term pair but the factors for determining a candidate translated term to be the translation result term further include the amount of correlation between the term to be translated and the candidate translated terms converted therefrom (i.e. the number of different translation paths from the term to be translated to the candidate translated terms). In addition, the mixed calculation also includes the self correlation value of the multi-language correlated term represented by each node in the translation path in the factors for determining a candidate translated term to be the translation result term. As such, a multi-language correlated term having a high appearance frequency on the Internet is not affected by a low correlation between the multi-language correlated terms. In addition, a multi-language correlated term having a low appearance frequency or an uncommon language still has noticeable contribution to the meaning consistency when translating the term to be translated into the translation result term.

Referring to FIG. 7A, on the translation path 702 from the node 602a representing the term to be translated "伯母" (wife of Father's elder brother) to the node 602c representing the candidate translated term "고모" (Father's sister), all the nodes including the start point (node 602a) and the end point (node 602c) are connected in series with connection lines. Referring to FIG. 7B, the translation path 704 from the node 602a representing the term to be translated "伯母" (wife of Father's elder brother) to the node 602b representing the candidate translated term "백모" (wife of Father's elder brother) includes two branch paths: one direct translation path 704a and an indirect translation path 704b indirectly translated from another language. The direct translation path 704a and the indirect translation path 704b are connected in parallel. To determine one of the candidate translated terms to be the translation result term, correlations between the term to be translated 602a and the candidate translated terms 602c and 602b have to be respectively calculated according to the translation paths 702 and 704.

In one embodiment, the method for calculating the correlations between the term to be translated 602a and the candidate translated terms using the node connection in the translation paths includes using the following equation I and equation II.

$$R_S = R1 + R2 + R3 + \ldots \quad \text{(Equation I)}$$

$$R_P = \cfrac{1}{\cfrac{1}{R11 + R12 + R13 + \ldots} + \cfrac{1}{R21 + R22 + R23 + \ldots} + \ldots} \quad \text{(Equation II)}$$

$R_S$ represents the correlation between the multi-language correlated term at the start point and the multi-language correlated term at the end point in a path segment when the nodes in the translation path segment are all connected in series. R1, R2, R3, etc. represent the self correlation values of the nodes or the term correlation values of the connection lines. $R_p$ represents the meaning correlation between the multi-language correlated term at the start point and the multi-language correlated term at the end point in a path segment when the translation path segment is formed of a plurality of branch paths connected in parallel. R11, R12, R13, etc. represent the self correlation values of the nodes connected in series and the term correlation values of the connection lines between the nodes on the branch path 1. R21, R22, R23, etc. represent the self correlation values of the nodes connected in series and the term correlation values of the connection lines between the nodes on the branch path 2 connected in parallel to the branch path 1.

The respective correlations R702 and R704 between the term to be translated "伯母" (wife of Father's elder brother) and the candidate translated term 602C ("고모" (Father's sister)) as well as between the term to be translated "伯母" (wife of Father's elder brother) and the candidate translated term 602b ("백모" (wife of Father's elder brother)) on the translation paths 702 and 704 as shown in FIG. 7 in the present embodiment can be obtained through the following calculations based on the above equation 1 and equation 2.

$$R702 = 3.69 + 9.56 + 2.91 + 11.28 = 27.44$$

$$R704 = \cfrac{1}{\cfrac{1}{3.69 + 14.05} + \cfrac{1}{3.69 + 9.56 + 2.91 + 24.42}} = 12.35$$

It should be noted that in the present embodiment, the distributed translation structure shown in FIG. 6 is built according to the term correlation values and self correlation values calculated from the co-appearance frequency and single-appearance frequency shown in FIG. 4 normalized using the function I and function II as shown in FIG. 5A. Therefore, it is to be understood that the correlation between two multi-language correlated terms has an inverse relationship to the term correlation value between the two multi-language correlated terms. As such, it can be deduced that the higher the correlation between the term to be translated and the candidate translated term on the translation path is, the lower the above calculated value is. On the contrary, the lower the correlation between the term to be translated and the candidate translated term is, the higher the above calculated value is. By comparing the values R702 and R704, it is clear that on the translation path 704, the term to be translated "伯母" (wife of Father's elder brother) has a higher correlation to the candidate translated term 602b ("백모" (wife of Father's elder brother)) than the candidate translated term 602c ("고모" (Father's sister)). Therefore, it is determined that the candidate translated term "백모" (wife of Father's elder brother) is the translation result term in the target language, Korean, of the term to be translated "伯母" (wife of Father's elder brother).

In the above embodiment, the fact that the correlation between two multi-language correlated terms has an inverse relationship to the term correlation value is deduced from the normalization functions I and II. The correlation between the term to be translated and the candidate translated term on the translation path has an inverse relationship to the calculated correlation value is thus further deduced. Nonetheless, the present invention is not limited thereto. In other words, the user has other options in choosing normalization functions according to personal experience or actual operational requirement and deduces a direct relationship or an inverse relationship that the correlation between the term to be translated and the candidate translated term has to the correlation value. The final translation result term can thereby be determined.

In all of the aforementioned embodiments, the translation method of the invention can be implemented by executing a computer readable program and the translation system can be the computer readable program/translation program. The computer readable program is stored in a computer readable-writable storage medium and is used to execute a plurality of instructions to implement the translation method of the invention. The execution steps of the translation method are clearly illustrated in the aforementioned embodiments and thus are not repeatedly described herein.

In summary, when analyzing the correlation between the term to be translated and a plurality of candidate translated terms, in addition to considering the term correlation value between two multi-language correlated terms having a corresponding relationship in translation, the invention also takes the number of branches of the multi-language translation from the term to be translated into the candidate translated terms as a consideration factor. In addition, the mixed calculation also includes the self correlation value of the multi-language correlated term represented by each node in the translation path in the factors for determining a candidate translated term to be the translation result term. As such, a multi-language correlated term having a high appearance frequency and a low correlation, a multi-language correlated term having a low appearance frequency or an uncommon language have noticeable contribution to the meaning consistency in the process of translating the term to be translated into the translation result term, thereby increasing translation precision.

Although the invention has been described with reference to the above embodiments, it will be apparent to one of the ordinary skill in the art that modifications to the described embodiment may be made without departing from the spirit of the invention. Accordingly, the scope of the invention will be defined by the attached claims not by the above detailed descriptions.

What is claimed is:

1. A translation method for translating a term to be translated in an initial language to a translation result term in a target language, the method comprising:

an electronic device collecting a plurality of multi-language correlated terms corresponding to the term to be translated based on the term to be translated and a plurality of language data sources, and establishing terms pairs each including any two of the multi-language correlated terms having a corresponding relationship in translation, wherein the multi-language correlated terms include at least the term to be translated and at least one candidate translated term in the target language;

the electronic device calculating a term correlation value between the two multi-language correlated terms for each of the term pairs and a self correlation value for each of the multi-language correlated terms, wherein, based on the term pairs, the electronic device builds a distributed translation structure in which the multi-language correlated terms are a plurality of nodes and the corresponding nodes in each of the term pairs are connected by a connection line and the distributed translation structure further comprises corresponding the self correlation values of the multi-language correlated terms to the nodes and corresponding the term correlation value of each of the term pairs to the connection line of the term pair; and the electronic device determining at least one of the at least one candidate translated term to be the translation result term based on the multi-language correlated terms and the respective self correlation values thereof as well as the term pairs and the respective tern correlation values thereof, wherein, based on the distributed translation structure, the electronic device analyzes at least one translation path with the term to be translated as a start point and each of the at least one candidate translated term as an end point and determines at least one of the at least one candidate translated term to be the translation result term based on the self correlation values and the term correlation values respectively corresponding to the nodes and the connection lines in the at least one translation path.

2. The translation method according to claim 1, wherein the electronic device establishing term pairs each including any two multi-language correlated terms having a corresponding relationship in translation further comprises the electronic device building a multi-language term reference table to store the term pairs.

3. The translation method according to claim 1, wherein the term correlation value of each of the term pairs is calculated by taking a co-appearance frequency of the two multi-language correlated terms of the corresponding term pair showing up in an Internet search result to be the term correlation value between the two multi-language correlated terms, and the self correlation value of each of the multi-language correlated terms is calculated by taking a single-appearance frequency of the multi-language correlated term showing up in the Internet search result to be the self correlation value of the multi-language correlated term.

4. The translation method according to claim 3, wherein the electronic device calculating the term correlation values and the self correlation values further comprises the electronic device first normalizing the co-appearance frequency and replacing the co-appearance frequency with the normalization result to be the term correlation value between the two multi-language correlated terms, and first normalizing the single-appearance frequency and replacing the single-appearance frequency with the normalization result as the self correlation value of the multi-language correlated term.

5. The translation method according to claim 1, wherein the language data sources comprise electronic dictionaries in multiple languages, translation software, Internet translation platforms, correspondence databases of language uses among countries using a same language, professional term reference tables in multiple languages, and traditional and simplified Chinese correspondence databases.

6. A translation system for translating a term to be translated in an initial language to a translation result term in a target language, the system comprising:

an input interface for receiving the term to be translated;

a multi-language term processing module collecting a plurality of multi-language correlated terms corresponding to the term to be translated based on the term to be translated and a plurality of language data sources, and establishing term pairs each including any two of the multi-language correlated terms having a corresponding relationship in translation, wherein the multi-language correlated terms include at least the term to be translated and at least one candidate translated term in the target language;

a term correlation calculation module calculating a term correlation value between the two multi-language correlated terms for each of the term pairs and a self correlation value for each of the multi-language correlated terms; and an analysis module determining at least one of the at least one candidate translated term to be the translation result term based on the multi-language correlated terms and the self correlation values thereof as well as the term pairs and the term correlation values thereof and further building a distributed translation structure in which the multi-language correlated terms are a plurality of nodes and the corresponding nodes in each of the term pairs are connected by a connection line, wherein the distributed translation structure further comprises corresponding the self correlation values of the multi-language correlated terms to the nodes and corresponding the term correlation value of each of the term pairs to the connection line of the term pair so that the analysis module further analyzes at least one translation path with the term to be translated as a start point and each of the at least one candidate translated term as an end point according to the distributed translation structure, and determines at least one of the at least one candidate translated term to be the translation result term based on the self correlation values and the term correlation values corresponding to the plurality of nodes and connection lines in the at least one translation path.

7. The translation system according to claim 6, wherein the multi-language term processing module further comprises building a multi-language term reference table to store the term pairs.

8. The translation system according to claim 6, wherein the term correlation calculation module calculates the term correlation value between the two multi-language correlated terms by taking a co-appearance frequency of the two multi-language correlated terms showing up in an Internet search result to be the term correlation value between the two multi-language correlated terns, and calculates the self correlation value of each of the multi-language correlated terms by taking a single-appearance frequency of the multi-language correlated term showing up in the Internet search result to be the self correlation value of the multi-language correlated term.

9. The translation system according to claim 8, wherein the term correlation calculation module further comprises first normalizing the co-appearance frequency and replacing the co-appearance frequency with the normalization result to be the term correlation value between the two multi-language correlated terms, and first normalizing the single-appearance frequency and replacing the single-appearance frequency with the normalization result as the self correlation value of the multi-language correlated term.

10. The translation system according to claim 6, wherein the language data sources comprise electronic dictionaries in multiple languages, translation software, Internet translation platforms, correspondence databases of language uses among countries using a same language, professional term reference tables in multiple languages, and traditional and simplified Chinese correspondence databases.

11. A non-transitory computer readable-writable storage medium for storing a translation program to translate a term to be translated in an initial language to a translation result term in a target language, wherein the translation program executes a plurality of instructions comprising:

collecting a plurality of multi-language correlated terms corresponding to the term to be translated based on the term to be translated and a plurality of language data sources, and establishing term pairs each including any two of the multi-language correlated terms having a corresponding relationship in translation, wherein the multi-language correlated terms include at least the term to be translated and at least one candidate translated term in the target language;

calculating a term correlation value between the two multi-language correlated terms for each of the term pairs and a self correlation value for each of the multi-language correlated terms to build a distributed translation structure in which the multi-language correlated terms are a plurality of nodes and the corresponding nodes in each of the term pairs are connected by a connection line, wherein the distributed translation structure further comprises corresponding the self correlation values of the multi-language correlated terms to the nodes and corresponding the term correlation value of each of the term pairs to the connection line of the term pair; and determining at least one of the at least one candidate translated term to be the translation result term based on the multi-language correlated terms and the respective self correlation values thereof as well as the term pairs and the respective term correlation values thereof, and, based on the distributed translation structure, analyzing at least one translation path with the term to be translated as a start point and each of the at least one candidate translated term as an end point and determining at least one of the at least one candidate translated term to be the translation result term based on the self correlation values and the term correlation values respectively corresponding to the nodes and the connection lines in the at least one translation path.

12. The non-transitory computer readable-writable storage medium according to claim 11, wherein the establishing term pairs each including any two multi-language correlated terms having a corresponding relationship in translation further comprises building a multi-language term reference table to store the term pairs.

* * * * *